United States Patent [19]
Comb et al.

[11] Patent Number: 5,939,008
[45] Date of Patent: Aug. 17, 1999

[54] RAPID PROTOTYPING APPARATUS

[75] Inventors: Jim Comb, Hamel; Steven E. Dockter, Eden Prairie; Paul A. Berens, Chaska, all of Minn.

[73] Assignee: Stratasys, Inc., Eden Prairie, Minn.

[21] Appl. No.: 09/013,544

[22] Filed: Jan. 26, 1998

[51] Int. Cl.⁶ .................................................. B29C 41/02
[52] U.S. Cl. ........................ 264/308; 425/375; 425/381
[58] Field of Search .................................. 425/375, 381; 264/308, 401

[56] References Cited

U.S. PATENT DOCUMENTS

| | | | |
|---|---|---|---|
| 4,749,347 | 6/1988 | Valavaara | 425/135 |
| 5,121,329 | 6/1992 | Crump | 364/468.26 |
| 5,141,680 | 8/1992 | Almquist et al. | 264/401 |
| 5,143,817 | 9/1992 | Lawton et al. | 264/401 |
| 5,303,141 | 4/1994 | Batchelder et al. | 364/149 |
| 5,340,433 | 8/1994 | Crump | 156/578 |
| 5,402,351 | 3/1995 | Batchelder et al. | 364/468.26 |
| 5,501,824 | 3/1996 | Almquist et al. | 264/401 |
| 5,503,785 | 4/1996 | Crump et al. | 264/40.7 |
| 5,569,349 | 10/1996 | Almquist et al. | 156/242 |
| 5,587,913 | 12/1996 | Abrams et al. | 364/468.26 |

*Primary Examiner*—Leo B. Tentoni
*Attorney, Agent, or Firm*—Kinney & Lange, P.A.

[57] ABSTRACT

A rapid prototyping system makes three-dimensional objects by sequentially depositing multiple layers of solidifying material on a flexible sheet substrate. The substrate is held against the top surface of a vacuum platen during deposition of the layers. When the object is completed, the substrate is released from the vacuum platen. By flexing the substrate, the object is peeled away from the substrate.

12 Claims, 9 Drawing Sheets

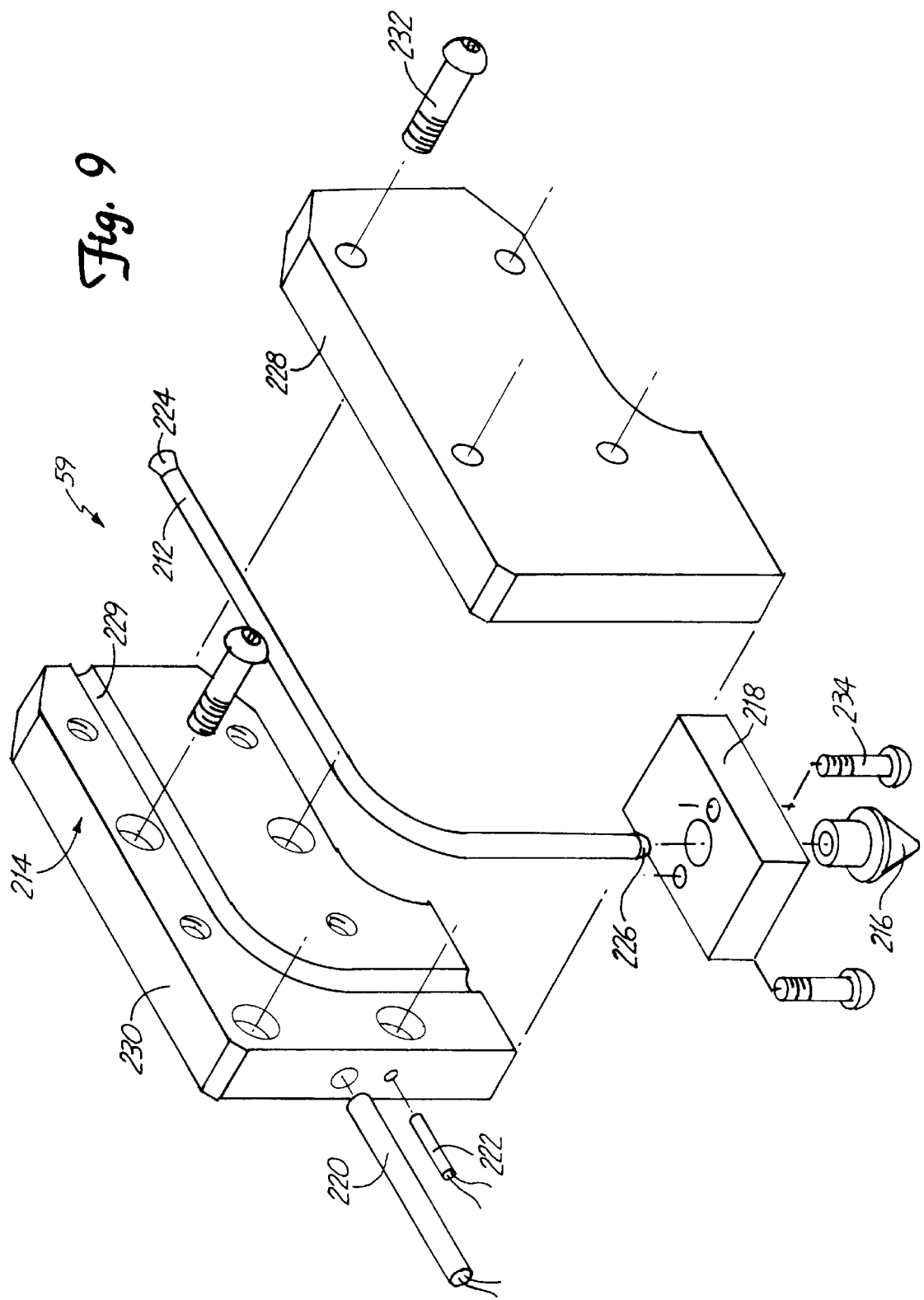

RAPID PROTOTYPING APPARATUS

BACKGROUND OF THE INVENTION

The present invention relates to the field of three-dimensional prototype modeling. In particular, the present invention is a rapid prototyping system for forming three-dimensional objects of predetermined design by depositing multiple layers of a material in its fluid state from an extrusion head onto a base. The material is selected and its temperature is controlled so that it solidifies upon extrusion or dispensing onto the base, with the build-up of the multiple layers forming the desired object. In the present invention, three-dimensional objects are formed on a flexible substrate which is held in position by a vacuum platen.

A rapid prototyping system evolves the making of three-dimensional objects based upon design data which is provided from a computer aided design (CAD) system. Examples of apparatus and methods for rapid prototyping of three-dimensional objects by depositing layers of solidifying material are described in Crump U.S. Pat. No. 5,121,329, Batchelder et al. U.S. Pat. No. 5,303,141, Crump U.S. Pat. No. 5,340,433, Batchelder U.S. Pat. No. 5,402,351, Batchelder U.S. Pat. No. 5,426,722, Crump et al. U.S. Pat. No. 5,503,785, and Abrams et al. U.S. Pat. No. 5,587,913, all of which are assigned to Stratasys, Inc.

In a rapid prototyping system of the type described in the aforementioned patents, the material being deposited must adhere to removable base member or substrate to form a foundation layer over which the remaining layers of the object are deposited, one layer at a time. It is preferred that parts deposited on the removable substrate be strongly adhered thereto to overcome two effects. First, strains generated within the extruded material tend to warp the deposited structures unless the structures are supported in their correct orientation. The substrate is important in serving to avoid localized shrinkage in the foundation layer. Second, there are forces from the deposition process itself, such as pull from the nozzle and centripetal acceleration on parts that are not stationary, that tend to distort the deposited structures. A delamination of the foundation layer from the substrate during the building of the object could result in a total failure in forming the object. Further, since the removable substrate becomes a defining surface for the parts being built, it must be held in a well-defined configuration approximating a plane.

After the object has been formed, it must be separated from the substrate without damage to the object. Therefore, after the deposition process, it is preferred that the parts deposited on the substrate be weakly adhered thereto in order that the parts might be removed from the extrusion apparatus without damage.

The Crump U.S. Pat. Nos. 5,121,329 and 5,340,433 teach the use of a fine wire mesh screen coated with sand as the substrate. The "sandpaper" can be applied to the base plate by double-faced adhesive tape. Separation of the object from this "sandpaper" substrate can be facilitated by applying a low voltage current to the wire mesh screen after the object is formed. The patents also suggest, as an alternative, a substrate made of water soluble wax which could be dissolved to separate the object from the substrate without damage. A third suggested alternative base member for receiving the foundation layer is a foam plastic material. The coarse, porous structure of a blue polystyrene material manufactured by Dow-Corning Corp. under that name is identified as particulary suitable.

A substrate may also be pre-coated with a thermoplastic adhesive that melts at a lower temperature than the deposited material, and heater elements mounted in a build platform to allow adhesive of the substrate to the base during the build process, and removal by heating the adhesive thereafter.

In rapid prototyping systems sold in the past by Stratasys, Inc., a preferred substrate material has been a polymer foam, which can be broken away from the object once it has been formed. The foam is removably mounted to a platform by spears that engage from the foam from all sides. While foam substrates have found substantial use, they have a number of disadvantages. First, it is difficult to maintain a perfectly flat substrate surface when a foam substrate is used, particularly when large objects are to be formed which require a large substrate. Second, foam substrates at times can be difficult to remove from the completed prototype objects. Third, removal of foam substrates produces dust.

SUMMARY OF THE INVENTION

The rapid prototyping system of the present invention forms three-dimensional physical objects by sequentially depositing multiple layers of solidifying materials onto a flexible sheet substrate. The flexible sheet substrate is mounted on the top surface of a platen, and is held in place by a releasable hold down force (such as a vacuum) which is applied between the platen and substrate. When the object has been formed, the hold down force between the platen and the substrate is released, the substrate is removed from the platen, and the substrate is flexed to peel the substrate from the object.

BRIEF DESCRIPTION OF THE DRAWINGS

FIG. 6A is a detailed view of a portion of FIG. 5 illustrating the vacuum platen grooves.

FIG. 6B is a detailed view of a portion of FIG. 5 illustrating the air bearing of the linear motor.

FIG. 7A is a perspective view of the outward face of the EEPROM board.

FIG. 9 is an exploded view of the liquifier.

DETAILED DESCRIPTION OF TIE PREFERRED EMBODIMENTS

Figure 1:
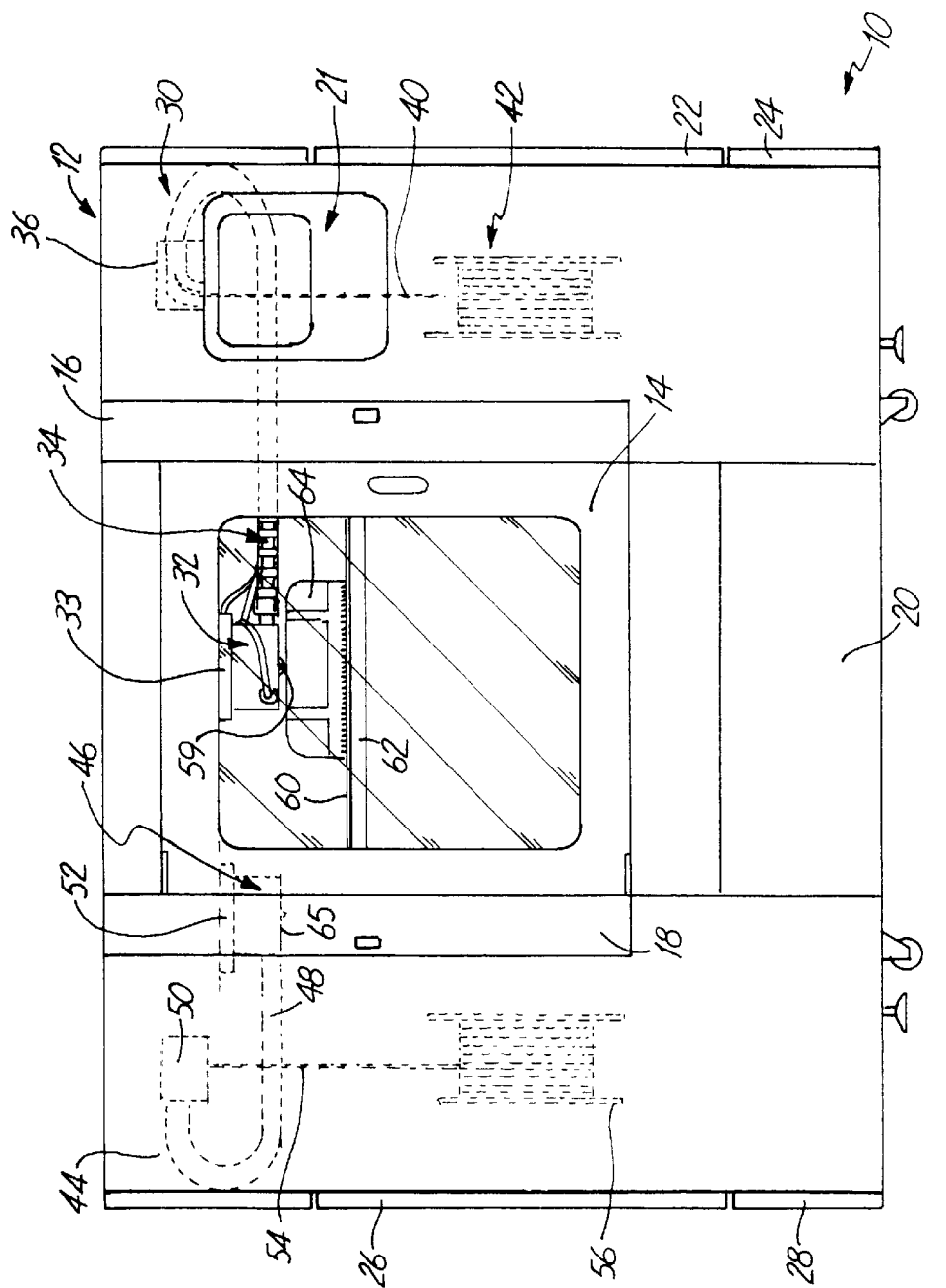
FIG. 1 is an exterior front elevation view of the preferred embodiment of the invention, showing the system in a build state.

In the preferred embodiment, the rapid prototyping system 10 is contained within a cabinet 12, as shown in FIG. 1. The cabinet 12 has doors and covers located on a front, left and right sides thereof On the front of cabinet 12, there is an envelope door 14, a modeling waste tray door 16 to the right of envelope door 14, a touch screen display panel 21 to the right of modeling waste tray door 16, a support waste tray door 18 to the left of envelope door 14, and platform cover 20 below envelope door 14. A modeling drybox door 22 and an electronics bay cover 24 are located on the right hand side of cabinet 12. A support drybox door 26 is located above a compressor bay cover 28 on the left hand side of cabinet 12.

The upper right hand side of cabinet 12 houses a modeling extrusion apparatus 30, which comprises a modeling extrusion head 32 attached below a modeling x-y forcer 33 and connected to the end of a modeling arm 34 which rotates about a modeling pivot joint 36. Modeling extrusion apparatus 30 receives a filament of modeling material 40 from a modeling filament spool 42 located in a modeling drybox 45 (FIG. 2) below pivot joint 36 and accessible through modeling drybox door 22. Drybox 45 maintains low humidity conditions to optimize the condition of filament 40. Modeling extrusion apparatus 30 is used to dispense modeling material in layers onto a substrate 60. Modeling filament spool 42 mounted on a modeling spindle 43 in drybox 45 is more clearly shown in FIG. 2.

The left-hand side of cabinet 12 houses a support extrusion apparatus 44, which is comprised of a support extrusion head 46 attached below a support x-y forcer 52 and connected to the end of a support arm 48 which rotates about a support pivot joint 50. Support extrusion apparatus 44 receives a filament of support material 54 from a support filament spool 56 located in a support filament drybox 57 (FIG. 3) beneath support pivot joint 50 and accessible through support drybox door 26. Drybox 57 maintains low humidity conditions to optimize the condition of filament 54. Support extrusion apparatus 44 is used to dispense support material in layers. Support filament spool 56 mounted on a support spindle 58 in drybox 57 is more clearly shown in FIG. 3.

Modeling material extruded in layers by modeling extrusion apparatus 30 forms object 64. The support material is used to support any over-hanging portions as the object is being built up. In building an object, over-hanging segments or portions which are not directly supported in the final geometry by the modeling material require a support structure. Support filament 54 is supplied to support extrusion head 46 which deposits material to provide the required support. The support material, like the modeling material, is deposited in multiple layers.

In building an object, only one extrusion apparatus at a time is in an active, extruding state. In FIG. 1, the system 10 is shown building a three-dimensional object 64, with modeling extrusion apparatus 30 in an active build state, and support extrusion apparatus 44 in a home rest position. When modeling extrusion apparatus 30 is in an active state, modeling filament 40 travels through arm 34 to extrusion head 32, where is it heated to a liquid state. Layers of modeling material in a molten state are deposited by head 32 through a liquifier 59 protruding through a bottom surface of head 32, onto substrate 60. Substrate 60 is supported upon a vacuum platen 62 and held in place by vacuum forces. When support extrusion apparatus 44 is in an active build state, support head 46 similarly receives support filament 54 via arm 48, and heats it to a liquid state. Layers of support material in a molten state are deposited by head 46 through a liquifier 59 protruding through a bottom surface of head 32, onto substrate 60.

The filaments of modeling and support materials are each a solid material which can be heated relatively rapidly above its solidification temperature, and which will very quickly solidify upon a small drop in temperature after being dispensed from the extrusion head. A composition having a relatively high adhesion to itself upon which it is deposited when hot is selected for the modeling material. A composition having a relatively low adhesion to the model material upon which it is deposited is selected for the support material, so that the support material forms a weak, breakable bond with the modeling material and to itself. When the object is complete, the support material is broken away by the operator, leaving the object formed of modeling material intact.

The modeling material is preferably a thermoplastic material. Other materials that may be used for the modeling material filament include bees wax, casting wax, machinable and industrial waxes, paraffin, a variety of thermoplastic resins, metals and metal alloys. Suitable metals include silver, gold, platinum, nickel, alloys of those metals, aluminum, copper, gold, lead, magnesium, steel, titanium, pewter, manganese and bronze. Glass, and particularly Corning glass would also be satisfactory. Chemical setting materials, including two-part epoxies would also be suitable. A modeling material found to be particularly suitable is an acrylonitrile-butadiene-styrene (ABS) composition. A material found to be particularly suitable for the support material is an acrylonitrile-butadiene-styrene (ABS) composition with a polystyrene copolymer added as a filler (up to about 80%) to create a lower surface energy of the ABS composition, and to provide a lower cohesion and adhesion of the material. Both filaments of material are preferably of a very small diameter, on the order of 0.070 inch. The filament may, however, be as small as 0.001 inch in diameter.

Figure 4:
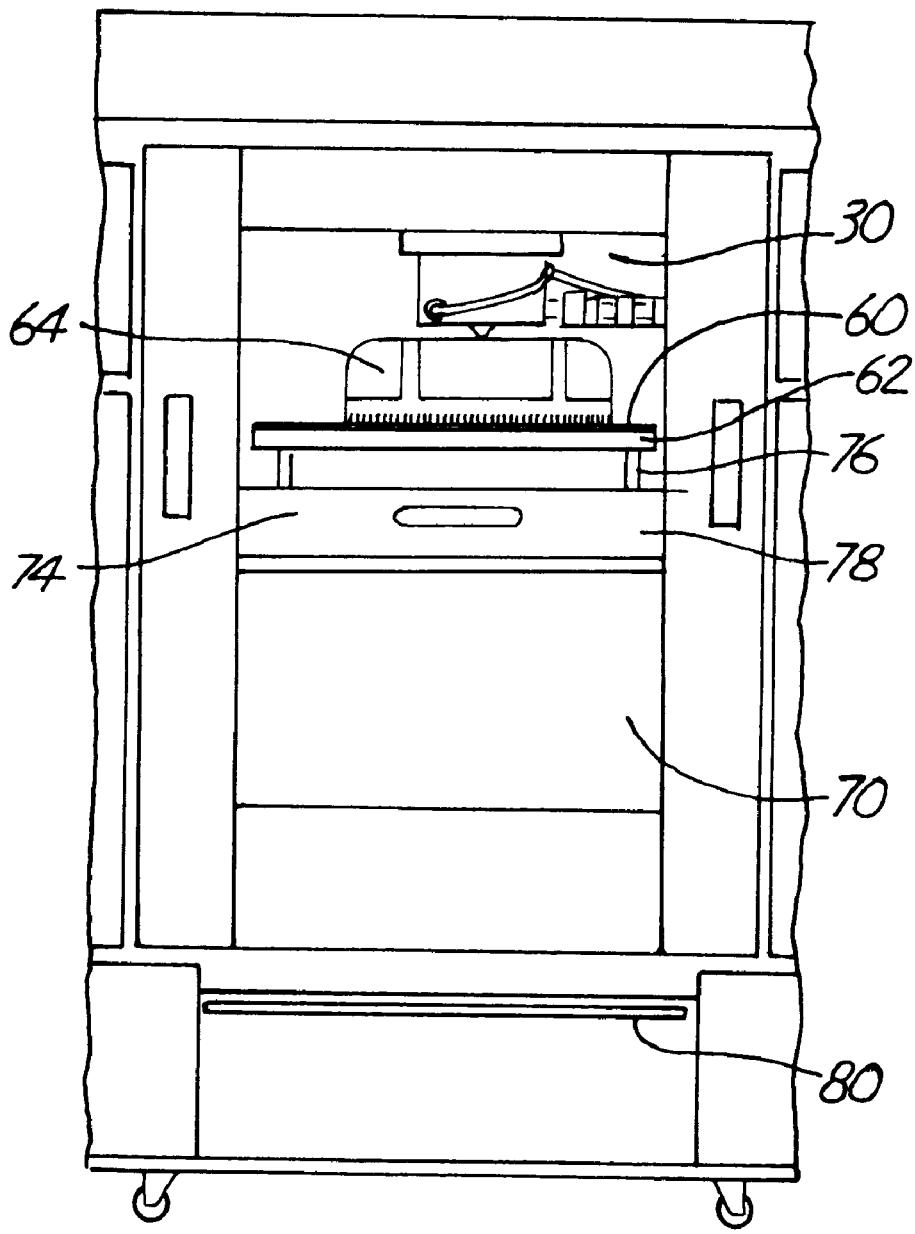
FIG. 4 is a front elevation view of the prototyping envelope, showing the system in a build state.

FIG. 4 shows a build envelope 70 which is the central interior region of the system 10, accessible through envelope door 14. In FIG. 4, door 14, platform cover 20, and the adjoining face plates of cabinet 12 are removed. The envelope 70 is where a three-dimensional object is built. Envelope 70 contains a build platform 74 which comprises vacuum platen 62 supported by a set of legs 76, which ride on a platform drawer 78. Build platform 74 moves vertically in a z-direction within envelope 70. Movement of build platform 74 is controlled by a z-drive chain 80, driven by a z-motor 114 (shown schematically in FIG. 5). Build platform 74 remains stationary during formation of a single layer. As each additional layer is deposited on substrate 60, build platform 74 is lowered slightly so as to allow a space for forming the subsequent layer. Platform drawer 78 pulls forward to allow the operator ready access to vacuum platen 62.

Figure 5:
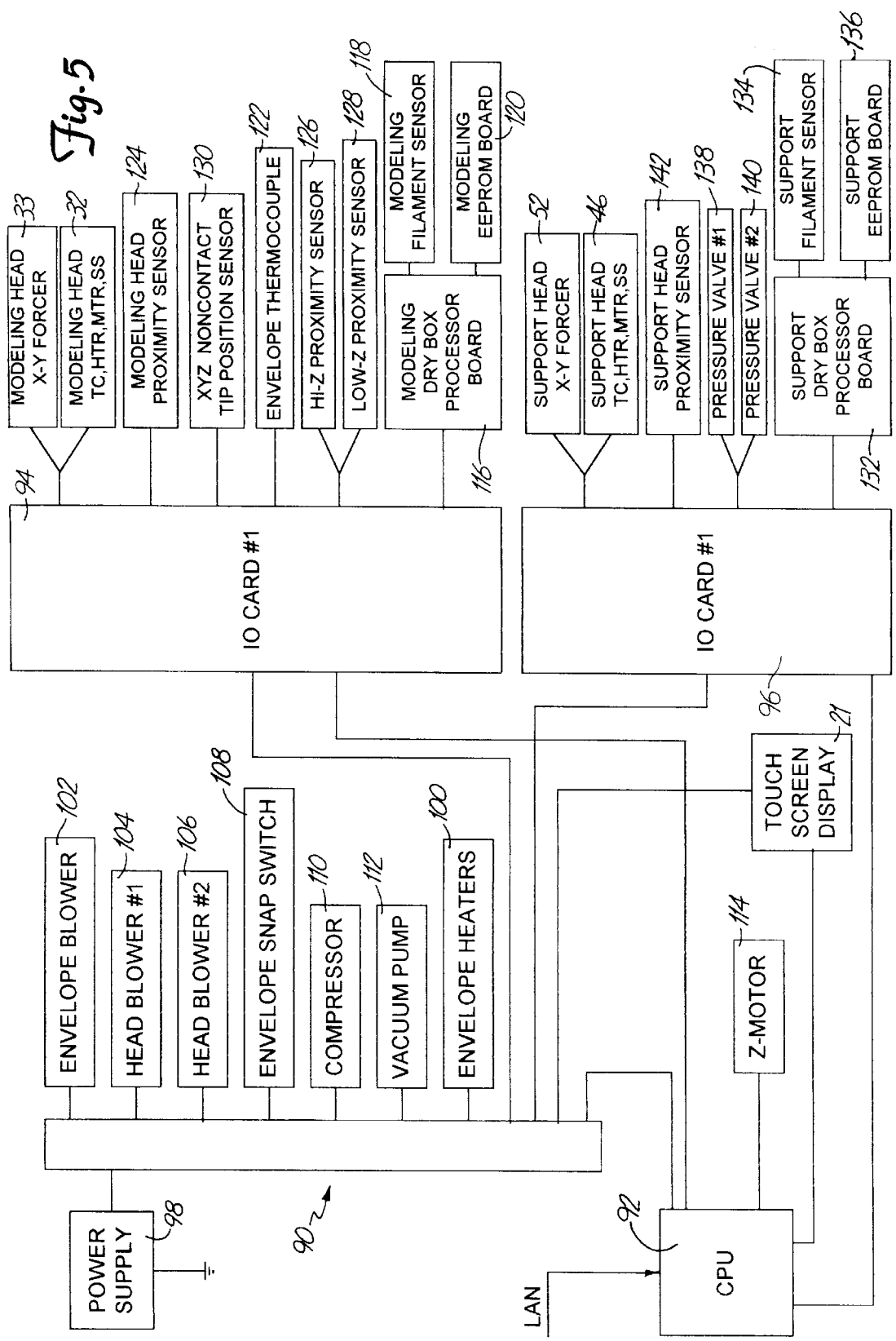
FIG. 5 is an electrical block diagram of the control system of the preferred embodiment of the invention.

An electrical system 90, shown schematically in FIG. 5, controls the system 10. A CPU 92, together with first input/output (IO) card 94 and second input/output (IO) card 96, control the overall operation of the electrical system 90. CPU 92 receives instructions from the operator through communication from touch screen display 21. Similarly, CPU 92 communicates with touch screen display 21 to display messages for the operator and to request input from the operator. CPU 92 in turn communicates with IO cards 94 and 96. A power supply 98 supplies power to electrical system 90.

Envelope heaters 100 and envelope blower 102 establish and maintain a temperature in the envelope 70 of approximately 80° C. An envelope thermal cutout (THCO) switch 108 carries current through the machine's main contractor actuation coil. If the temperature reaches approximately 120° C. the THCO switch opens and current through the main contractor to the system is interrupted. The head blowers 104 and 106 supply air at ambient temperature to cool the pathway of filaments 40 and 54 as they travel into modeling extrusion head 32 and support extrusion head 46, respectively.

CPU 92 also controls a compressor 110. Compressor 110 supplies compressed air alternately to x-y forcers 33 and 52 provides a vacuum to platen 62. CPU 92 provides layering drive signals to selectively actuate the z-motor 114, which drives platform 74 along the z-axis.

IO Card 94, under the control of CPU 92, sends and receives signals associated with modeling extrusion head 32 and the filament supply thereto. IO card 94 sends drive signals that control the movement and position of x-y forcer 33. IO card 94 further sends and receives signals to and from modeling extrusion head 32, which includes a thermocouple 222 (TC), a heater 220 (HTR), a motor 246 (MTR) and a safety switch 210 (SS) (shown in FIGS. 8–10). Safety switch 210 shuts down the system if the temperature in the modeling extrusion head 32 gets too high.

IO card 94 monitors data concerning modeling material filament spool 42 through communications with a modeling drybox processor board 116. Modeling drybox processor board 116 is mounted inside of modeling filament drybox 45. It receives data concerning the modeling filament from a modeling filament sensor 118 (located at the inlet to filament guide 236, shown in FIG. 8) and a modeling EEPROM board 120, which is a circuit board carrying an electronically readable and writeable device (EEPROM 188, shown in FIG. 7) attached to modeling material filament spool 42. EEPROM board 120 acts as an electronic tag with a variety of functions. It informs the control system 90 of the type of filament that is on the spool and of the lineal feet of filament on the spool. As filament 40 is wound off of the spool 42, the CPU keeps track of how much material was commanded to be extruded, subtracts this amount from the total on the EEPROM 188 and writes the new value to the EEPROM 188 Preferably, the data on EEPROM board 120 is encrypted so that it can be updated the CPU 92. Filament sensor 118 senses and indicates the presence or absence of filament at the entrance to the filament feed tube. With filament remaining on the spool, the operator can then grab ahold of the filament and extract it from the extrusion head 32. Unloading of the used filament and spool and reloading of a new spool is thereby made easier.

CPU 92 receives the modeling filament data from IO card 94. At the outset of a job, the CPU 92 will calculate whether a spool 42 or 56 contains enough filament to complete the job. Operator notification is then provided via touch screen display 21, stating either that the filament is adequate to complete the job, or that the filament spool will need replacement and reloading during the process. Also at the outset of a job, the CPU verifies that the modeling filament material on the spool is the same material specified in object data. If these materials are not the same, an operator notification is provided via touch screen display 21, providing the operator an opportunity to switch spools.

IO card 94 additionally monitors the temperature in the envelope 70 via signals received from envelope thermocouple 122, and it sends signals to and from a modeling head proximity sensor 124, a high-z proximity sensor 126, a low-z proximity sensor 128 and an xyz noncontact tip position sensor 130, all of which are described below.

IO card 96 serves similar functions as IO card 94, for the support extrusion head 52 and the filament supply thereto. IO card 96 sends drive signals that control the movement and position of x-y forcer 52. 10 card 96 further sends and receives signals to and from support extrusion head 46, which includes a thermocouple (TC), a heater (HTR), a motor (MTR) and a safety switch (SS). The safety switch SS shuts down the system if the temperature in the modeling extrusion head 46 gets too high.

IO card 96 monitors data concerning support material filament spool 56 through communications with a support drybox processor board 132. It receives data concerning the support filament from a support filament sensor 134 and a support EEPROM board 136, attached to support material filament spool 56. EEPROM board 136 acts as an electronic tag, in the same manner as EEPROM board 120. CPU 92 receives the support filament data from support processor board 132, and uses it to provide operator information in the same manner as described above with respect to the modeling filament.

IO card 96 further controls a first pressure valve 138 and a second pressure valve 140, which alternately open and shut to direct the flow of air from compressor 110. When valve 138 is closed and valve 140 is open, air from compressor 110 is directed to modeling head x-y forcer 33. When valve 138 is open and valve 140 is closed, air from compressor 110 is directed to support head x-y forcer 52. IO card 96 in addition communicates with support head proximity sensor 142, which is described below.

To create an object using rapid prototyping system 10, an operator must first power up the system by pressing a power on switch (not shown), located on touch screen display 21. The system 10 then enters a maintenance mode, in which the system executes a routine to calibrate the locations of modeling extrusion head 32, support extrusion head 46, and build platform 74. The calibration is done in two phases. In the first phase, the system initializes movement boundaries for the extrusion heads and the platform. Modeling head proximity sensor 124 initializes boundaries of the modeling head 32, and support head proximity sensor 142 initializes boundaries of the support head 44. High-z proximity sensor 126 and low-z proximity sensor 128 together initialize the boundaries of platform 74. In the second stage, the xyz noncontact tip position sensor 130 initializes the position of the tips of liquifiers 59 and 65. The xyz noncontact tip position sensor 130 is a magnetic sensor imbedded in platform 74 which detects position of the liquifier tips with three displacement degrees of freedom. Tip position sensor 130 is of the type described in co-pending application Ser. No. 08/556,583, which is incorporated by reference.

After calibration is complete, the system exits the maintenance mode and enters a standby state. In the standby state, the design of a three-dimensional object 64 is input to CPU 92 via a LAN network connection (shown schematically in FIG. 5) utilizing CAD software such as QUICKSLICE® from Stratasys, Inc., which sections the object design into multiple layers to provide multiple-layer data corresponding to the particular shape of each separate layer. After the layering data is received, the system 10 enters a warmup phase, during which the envelope 70 is heated. Upon reaching a temperature of 80° C., the system enters a build state during which it creates the three-dimensional object.

Figure 6:
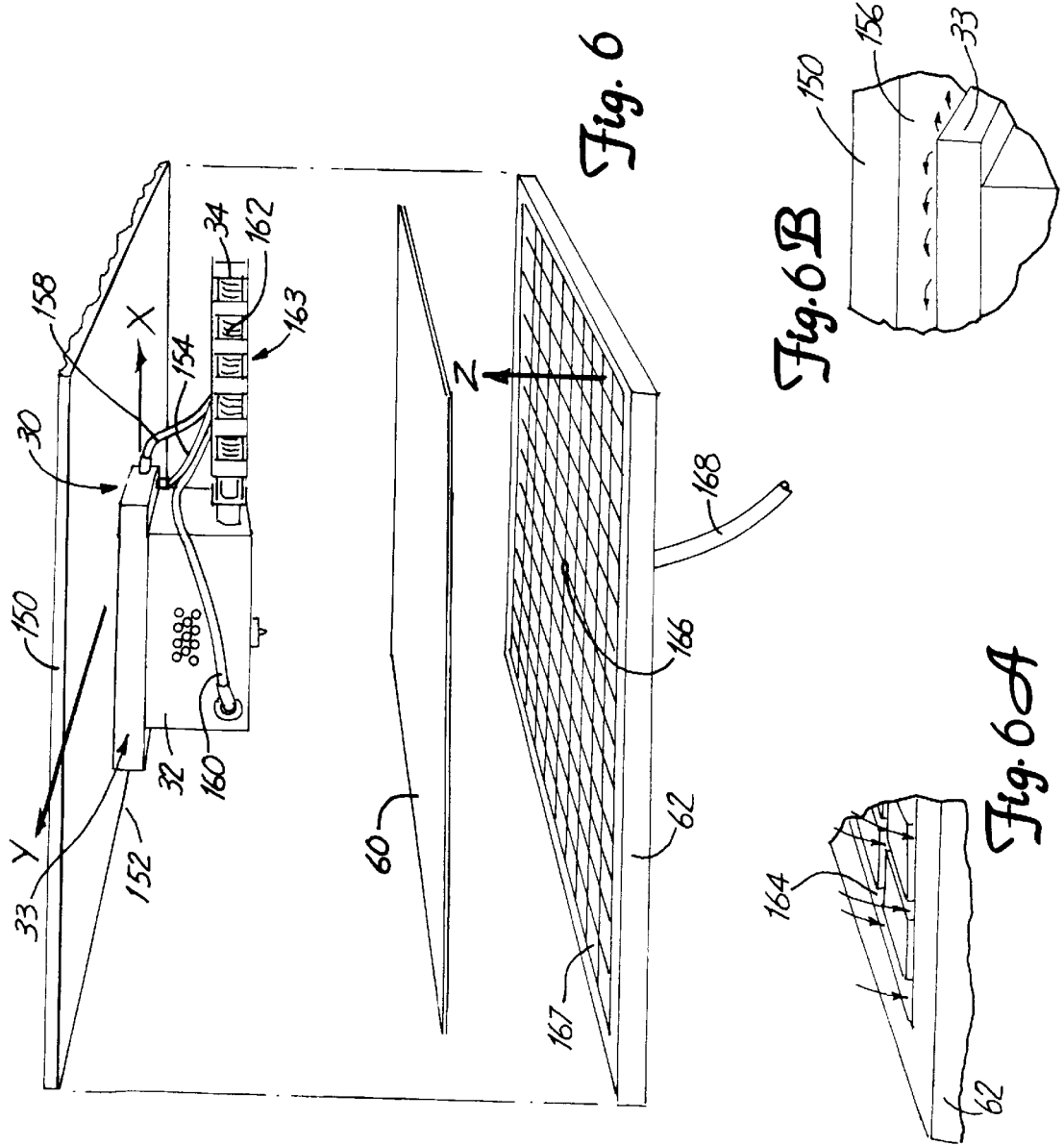
FIG. 6 is a partially exploded perspective view of the prototyping envelope showing the modeling extrusion head in a build position.

The modeling extrusion apparatus 30 is shown more particularly in FIG. 6. Modeling extrusion apparatus 30 is movable in a horizontal plane in x and y directions. Modeling x-y forcer 33 is positioned beneath and parallel to a planer stator 150, which contains a grid of stator elements (not shown). Together x-y forcer 33 and planer stator 150 form an electromagnetic linear stepper motor 152. Commercially available linear stepper motors from Northern Magnetics, Inc. of Santa Clarita, Calif. are suitable. The x-y forcer 33 consists of two sets of single-axis forcers mounted at 90° to each other and permanent magnets which hold forcer 33 against the stator (not shown). A compressed air supply 154, supplied by compressor 110, is provided to x-y forcer 33 when modeling apparatus 30 is active. The compressed air supply 154 flows upward through x-y forcer 33 and exits through a top surface thereof, as is illustrated in FIG. 6B. The exiting air forms an air bearing 156 between x-y forcer 33 and planer stator 150, which allows nearly frictionless motion of the forcer in a horizontal plane below planer stator 150. Drive signals to x-y forcer 33 are received through an electrical supply 158 which powers a stepper motor driver located within x-y forcer 33 (not shown) to achieve motion. Ordinarily, linear stepper motors of this type exhibit abrupt jarring motions which create mechanical resonance. This resonance typically precludes use of such motors in high-precision systems such as rapid prototyping systems. As described below, an umbilical to the head creates the surprising result of providing a damping effect sufficient to allow high-precision deposition at speeds far exceeding those possible in prior art rapid prototyping systems.

Figure 8:
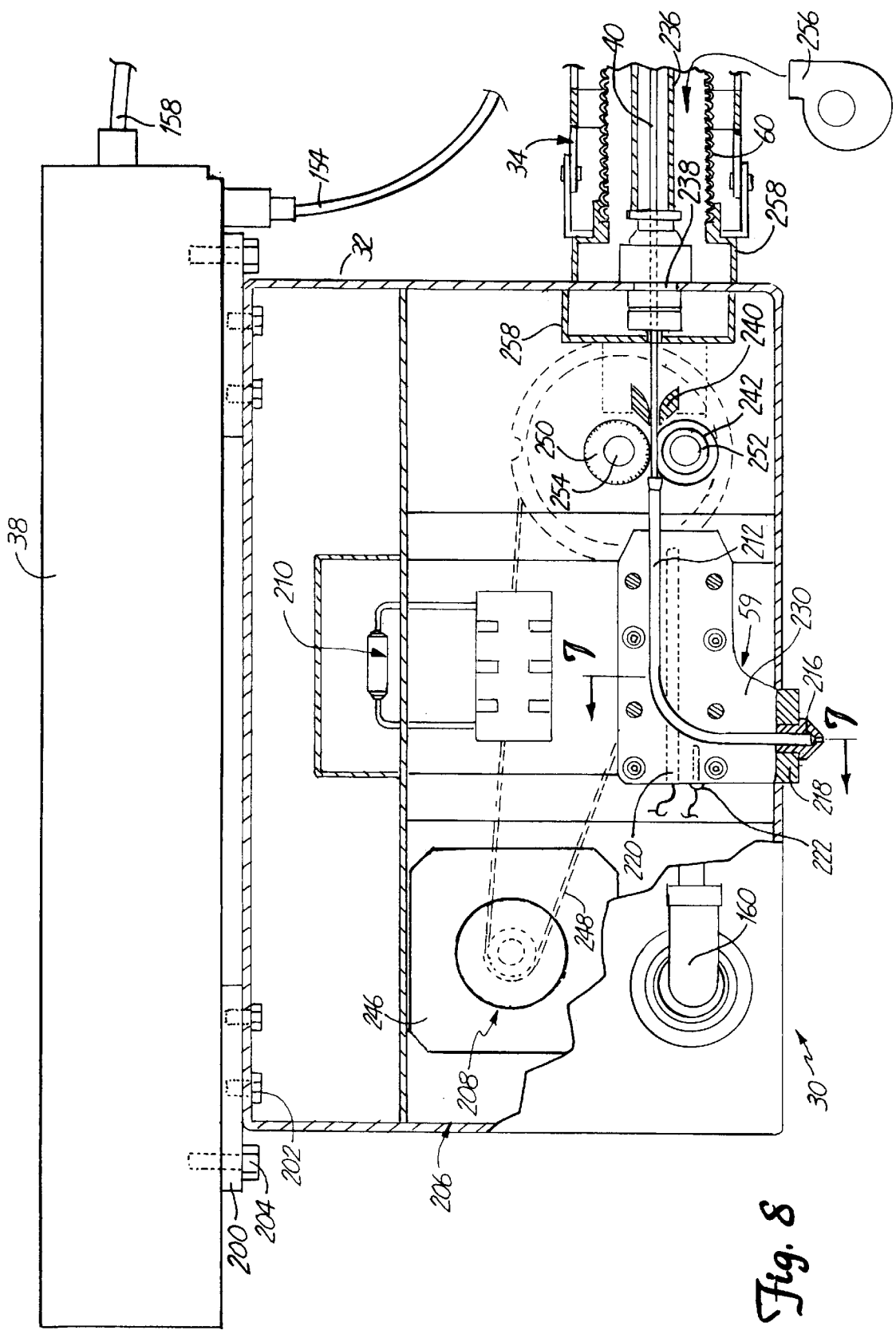
FIG. 8 is a front elevation of the modeling extrusion head, with portions shown in sectional.

Modeling extrusion arm 34 is a flexible chain carrier that is flexible in a horizontal plane and substantially rigid in other directions. Arm 34 carries within it air supply 154 and forcer electrical supply 158. Arm 34 also carries within it a modeling extrusion head electrical supply 160 and a flexible air tube 162 which contains an ambient air supply and modeling filament 40, as depicted in FIG. 8. Arm 34 together with air supply 154, forcer electrical supply 158, extrusion head electrical supply 160 and air tube 162 containing filament 40 form an umbilical 163 to extrusion head 32. The umbilical 163 creates the surprising result of damping the mechanical resonance of extrusion head 32 with respect to stator 30, which is produce by acceleration and deceleration of the head 32 by forcer 33. In the preferred embodiment, the combined weight of head 32 and x-y forcer 33 is less than or equal to approximately 8 lbs.

The resonant frequency is about 55 Hz for small oscillations and about 45 Hz for large oscillations, and the damping time to achieve 98% of the final value (which is equal to approximately 4 times the damping time constant) in this embodiment is less than or equal to about 150 ms. Oscillation and damping of mechanical resonance may be expressed as: $A=A_o \sin(\omega t + \Phi)e^{-t/\tau}$, where A=amplitude, $A_o$=initial undamped amplitude, $w=2\pi f$, f=resonant frequency of the system, $\Phi$=a phase constant, t=time, and $\tau$=damping time constant. Critical damping occurs when $\tau=1/\omega$. In the preferred embodiment described, the system is approximately a factor often from being critically damped. Further damping can, therefore, be added if desired. The damping time constant is affected by the combined weight of extrusion head 32 and x-y forcer 33. The lighter the weight, the shorter the damping time constant.

Damping of mechanical resonance is achieved primarily by frictional forces produced during movement of umbilical 163. Alternatively, other forms of damping means can be used, such as an oscillation dissipater (or shock-absorber) carried in extrusion head 32. Also, further damping can be produced by decreasing the resistivity of the bucking of starter 150 (such as by using copper rather than steel) to increase eddy current losses within stator 150.

While FIG. 5 has been described as depicting modeling apparatus 30, it should be understood that support head apparatus 44 has a similar structure and has an umbilical of the same type described with reference to modeling apparatus 30. Specifically, support x-y forcer 52 shares the planer stator 150 such that x-y forcer 52 and stator 150 form a second linear motor. Support apparatus 44 starts from the opposite side of cabinet 12 from modeling apparatus 30. For ease of reference, only one head is shown in detail.

Vacuum platen 62 and substrate 60 are shown in an exploded fashion in FIG. 6. Vacuum platen 62 has a top surface 167 comprised of a grid of grooves 164, shown in detail in FIG. 6A. In the preferred embodiment, grooves 164 are 0.06 inches deep, 0.06 inches wide, and are 1 inch on center apart. An orifice 166 extends through the center of vacuum platen 62. Orifice 166 receives a vacuum hose 168 which connects to vacuum pump 112. When the system 10 is powered up, a vacuum is applied to vacuum platen 62 by vacuum hose 168 and vacuum pump 112. The vacuum provided to platen 62 pulls air through grooves 164 to distribute the vacuum along the platen. This vacuum holds the substrate 60 against the top surface 167 of platen 62. In the preferred embodiment, substrate 60 is a flexible sheet. A polymeric material forms a suitable flexible sheet substrate. An acrylic sheet with a thickness of about 0.06 inches has been successfully used as a substrate. When a desired object is formed, the operator can remove substrate 60 from the platen 62 by lifting one corner of the sheet and breaking the seal of the applied vacuum.

Flexible substrate 60 can be flexed away from the object to peel the substrate from the object, if there is a weak breakable bond between substrate 60 and the object. This weak, breakable bond may be formed by depositing a first layer (or layers) of modeling material followed by a second layer (or layers) of support material on the substrate 60. The modeling material and substrate are selected so that the modeling material is fully adhesive to the substrate. In forming an object, the modeling material is deposited in one or more layers on the substrate 60. The support material is then deposited in one or more layers over the modeling material. The object is then built up on the support material, using a plurality of layers of modeling and/or support material. When the object is complete, vacuum is broken by lifting a corner of the substrate 60, and the substrate 60 is removed from the platen 62 by the operator. By flexing the substrate 60, the operator then peels the substrate 60 from the object. The first layer(s) of modeling material will remain adhered to the substrate, but the weak bond between the first layer(s) of modeling material and the second layer (s) of support material is a readily separable joint which breaks to allow removal of the substrate 60 without damage to the object.

Other flexible sheet materials may be used as substrate 60. For example, plain or coated paper, metal foil and other polymeric materials are suitable. For high temperature support and modeling materials, a polymeric material (e.g., Kapton) or metal foil is particularly desirable.

Although a vacuum is a preferred way to achieve a releasable hold down force to hold substrate 60 against platen 62, other means for providing a releasable hold down force can also be used. For example, substrate 60 can be held against platen 62 by an electrostatic chuck or by a weakly adhering adhesive applied to the bottom surface of the substrate 60 or the top surface of the platen 62 (or both).

Figure 3:
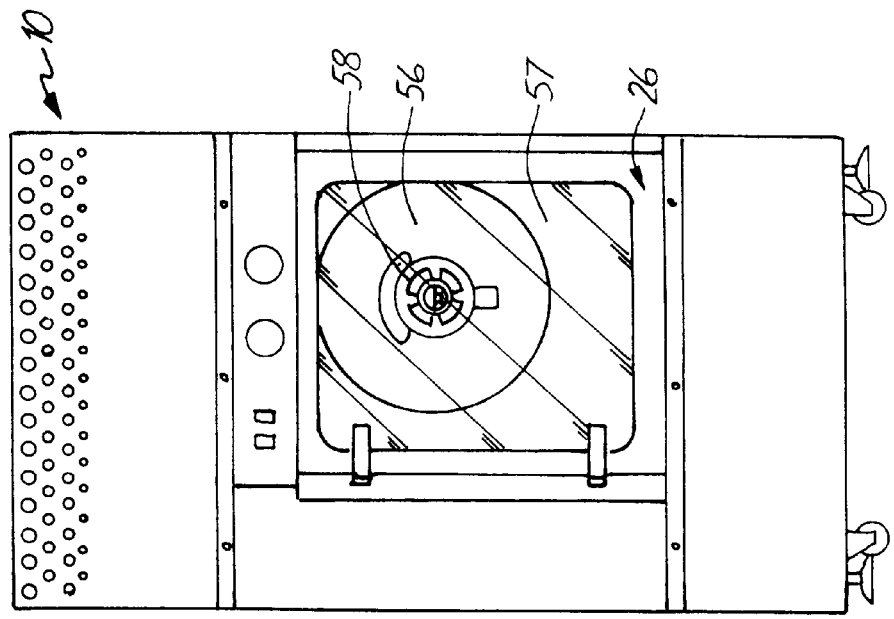
FIG. 3 is an exterior elevation view of the left side of the preferred embodiment of the invention.
Figure 2:
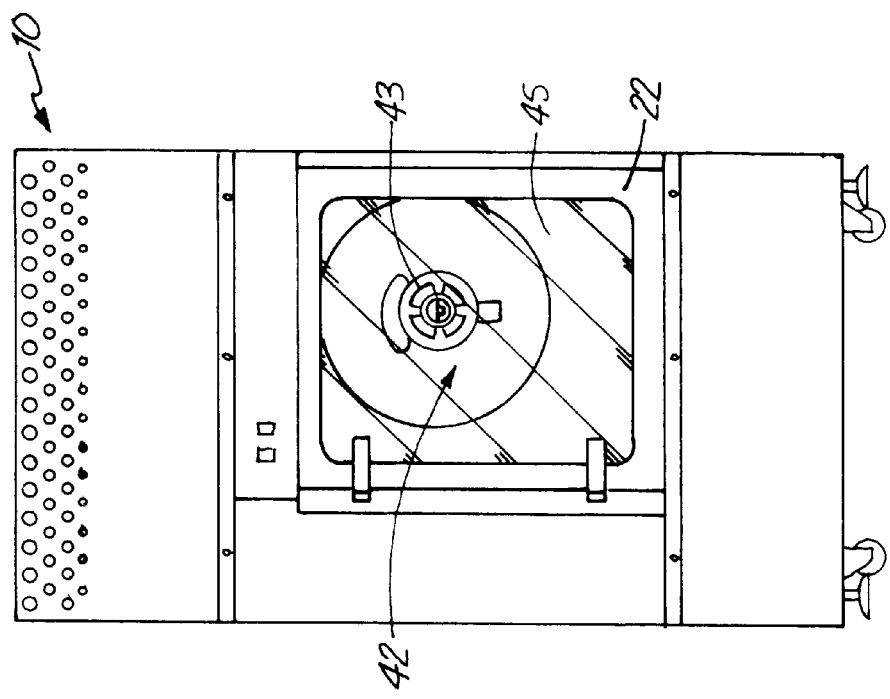
FIG. 2 is an exterior elevation view of the right side of the preferred embodiment of the invention.
Figure 7:
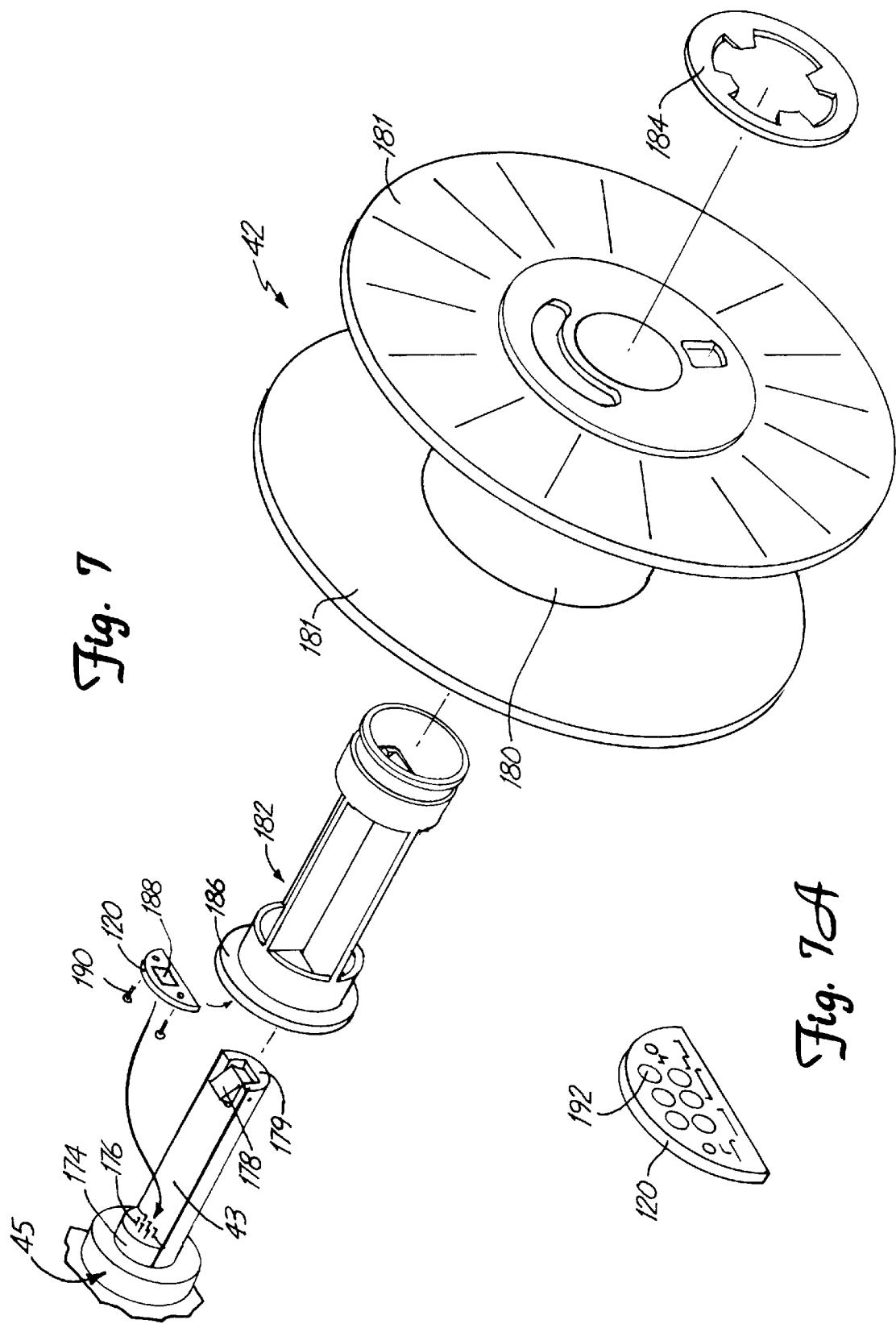
FIG. 7 is an exploded view of the filament spindle and filament spool shown in FIGS. 2 and 3.

FIG. 7 shows a detailed exploded view of the filament spool and spindle shown in FIGS. 2 and 3. The mechanical configuration of the filament spool and spindle is identical for both the modeling filament and the support filament. For convenience of reference, FIG. 7 is directed specifically to modeling filament spool 42 and modeling spindle 43. Spindle 43 extends horizontally from drybox 45 and has a semi-circular shape. A semi-circular connector 174 having a set of six depressive connector pins 176 is mounted on top of spindle 43 adjoining drybox 45. A spring-loaded latch 178 is embedded in the top of spindle 43 at an outer edge 179.

Filament spool 42 is comprised of a center barrel 180 on which filament may be wound, a pair of spool flanges 181 extending from either end of barrel 180, a sleeve 182 that fits within barrel 180 for receiving spindle 43, and modeling EEPROM board 120 mounted inside sleeve 182 and perpendicular to barrel 180. Barrel 180 rotates about sleeve 182 so that filament 40 may be unwound from spool 42. Sleeve 182 has a flange 184 at one end, a flange 186 at the opposite end, and an interior semi-circular cavity for receiving spindle 43. In the preferred embodiment, flange 184 is removable and flange 186 is fixed. Removal of flange 184 allows withdrawal of sleeve 182 from barrel 180. As mentioned above, EEPROM board 120 carries EEPROM 188. In a preferred embodiment, EEPROM board 120 is mounted adjacent fixed flange 186 by a pair of screws 190, so that EEPROM 188 faces inward towards sleeve 182 for protection. EEPROM board 120 on its outward facing side carries a set of six round electrical contacts 192, as shown in FIG. 7A. Connectors 192 are configured so as to provide a receiving surface for connector pins 176 when spool 42 is mounted on spindle 43.

Latch 178 must be manually depressed to allow insertion or removal of spindle 43 from sleeve 182. When sleeve 182 is mounted on spindle 43, latch 179 rests in an upward position so as to lock spool 42 into place such that contacts 192 fully depress connector pins 176. When filament spool 42 is manually inserted onto spool holder 43, electrical contact between EEPROM board 120 and drybox processor board 116 is made through the connector 190.

Detail of the extrusion apparatus is shown in FIG. 8. While FIG. 8 shows modeling extrusion apparatus 30, it should be understood that support extrusion apparatus 44 contains the same parts and operates in the same manner as modeling extrusion apparatus 30, at a 180° rotation. Extrusion head 32 is mounted below x-y forcer 38 by a pair of mounting plates 200. Two pairs of bolts 202 attach head 32 to plates 200. Two bolts 204 connect plates 200 to x-y forcer 38 to hold head 32.

Extrusion head 32 is formed of an enclosure 206 which holds liquifier 59, a filament drive 208 and safety switch 210. Liquifier 59 comprises a thermal conducting thin-wall tube 212, a heating block 214, an extrusion tip 216, a tip retainer 218, heater 220 and thermocouple 222. FIG. 9 shows liquifier 59 in an exploded view. As shown in FIG. 9, thin-wall tube 212 has an inlet end 224, an outlet end 226, and is bent at a 90° angle. In the preferred embodiment, tip 216 is soldered into the outlet end of tube 212. Alternatively, tip 216 may be brazed or welded to tube 212. Using a 0.070 inch filament, tube 212 preferably has an inner diameter of about 0.074 inches. The wall thickness of tube 212 is preferably between 0.005–0.015 inches. It is desirable to keep tube 212 as thin as possible to achieve maximum heat transfer across tube 212 to filament 40. Other metals may also be used, such as brass, copper, tungsten, titanium molybdenum, beryllium copper or other steels. Other thermal conducting materials such as polymide (Kapton), a plastic with a high melting temperature, may also be used to form the thin-wall tube.

Tube 212 fits into a channel 229 of heating block 214, between a front section 228 and a rear section 230 of the heating block. Heating block 214 is made of a heat conductive material such as aluminum or beryllium copper. A set of four bolts 232 extend through outer section 228 and rear section 230 of heating block 214 to hold tube 212. When mounted in heating block 214, a first section of tube 212 adjacent the inlet end 224 is exterior to heating block 214, and a second mid-section of tube 212 is clamped within heating block 214, and a third section of tube 212 including tip 216 extends through the bottom of block 214. The first section of tube 212 forms a cap zone for the liquifier 59, the second section of tube 212 forms a heating zone, and the third section forms a nozzle zone. The nozzle zone is contained within and silver soldered to extrusion tip 216, which is supported against heating block 214 by tip retainer 218, a square plate having a center orifice. Tip retainer 218 is press fit around the extrusion tip 216, and mounted beneath heating block 214 by a pair of screws 234.

The length of the cap zone of tube 212 is in the range of 0.15 inches and 2 inches. The cap zone must undergo a temperature gradient from about 70 degrees C. envelope temperature to about 280 degrees C. liquifier temperature. A shorter cap zone allows for greater control by the system over the rate that molten filament is extruded (i.e., flow rate), but makes it more difficult to maintain a cool temperature for the filament through the cap zone. The length of the heating zone is anywhere from 0.04 inches to 7 inches. The longer the heating zone, the higher the maximum extruded flow rate, but the slower that the flow rate can be accelerated and decelerated. A liquifier having a cap zone of between 0.02–0.04 inches long and a heating zone of about 2.5 inches long has been successfully used in a preferred embodiment of the system.

Cylindrical heater 220 and thermocouple 222 extend horizontally into rear section 230 of heating block 214. Heater 220 is positioned in heat exchange relation to the heating zone of tube 212, to heat the tube to a temperature just above the melting temperature of the filament. Using an ABS composition for the filament 40, the tube is heated to about 270 degrees C. Thermocouple 222 is positioned adjacent tube 212 to monitor the temperature in the tube. Safety switch 210 will cause the system 10 to shut down if temperature exceeds a predetermined level.

A guide tube 236 guides filament 40 from pivot 36 to extrusion head 32, made of a suitable low friction material such as Teflon for support in motion. As described above, filament 40 within guide tube 36 are located within flexible tube 60 contained inside of arm 34. Filament 40 enters extrusion head 32 through an inlet aperture 238. Inside of extrusion head 32, filament 40 is fed through a tapered guide 240 having a restricted guide passage 242. Filament drive 208, comprised of a stepper motor 246, a puffy 248 and a pair of feed rollers 250 and 252. Roller 250 has a drive shaft 254 which is driven by stepper motor 246. Roller 252 is a rubber-coated idler. Filament 40 is fed from the guide passage 242 of tapered guide 240 into a nip between rollers 250 and 252. The rotation of roller 250 advances filament 40 towards liquifier 59. The inlet end 224 of thin-wall tube 212 is positioned to receive filament 40 as it passes through rollers 250 and 252. The flow rate of the molten filament out of liquifier 59 is controlled by the speed at which filament drive 208 advances the filament 40 into liquifier 59.

A blower 256 blows air at ambient temperature into flexible tube 60 to cool guide tube 236 and filament 40. Cooling of strand 40 is important so as to maintain the filament at a sufficiently low temperature that is does not become limp and buckled within the passages leading into the liquifier 59. Air from blower 256 travels through tube 60 and enters extrusion head 32 via an air conduit 258. Air conduit 258 provides a path for the air which is in a forward and parallel position from filament 40 within extrusion head 32.

Figure 10A:
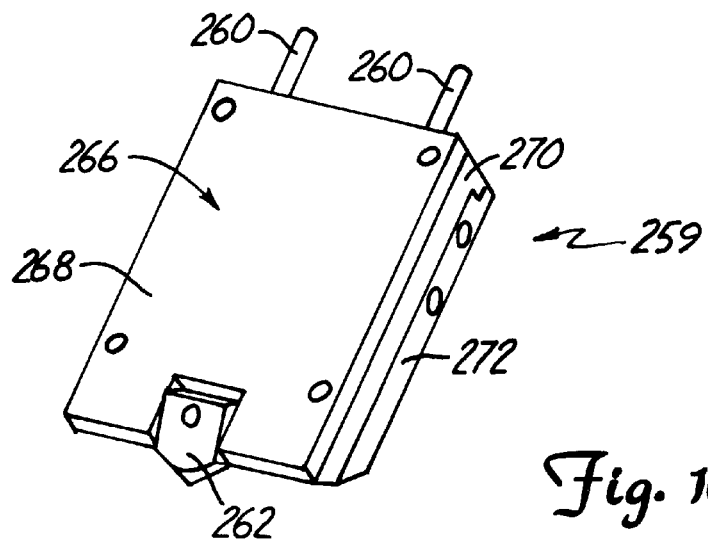
FIGS. 10A and 10B show an alternative embodiment of the liquifier.
Figure 10B:
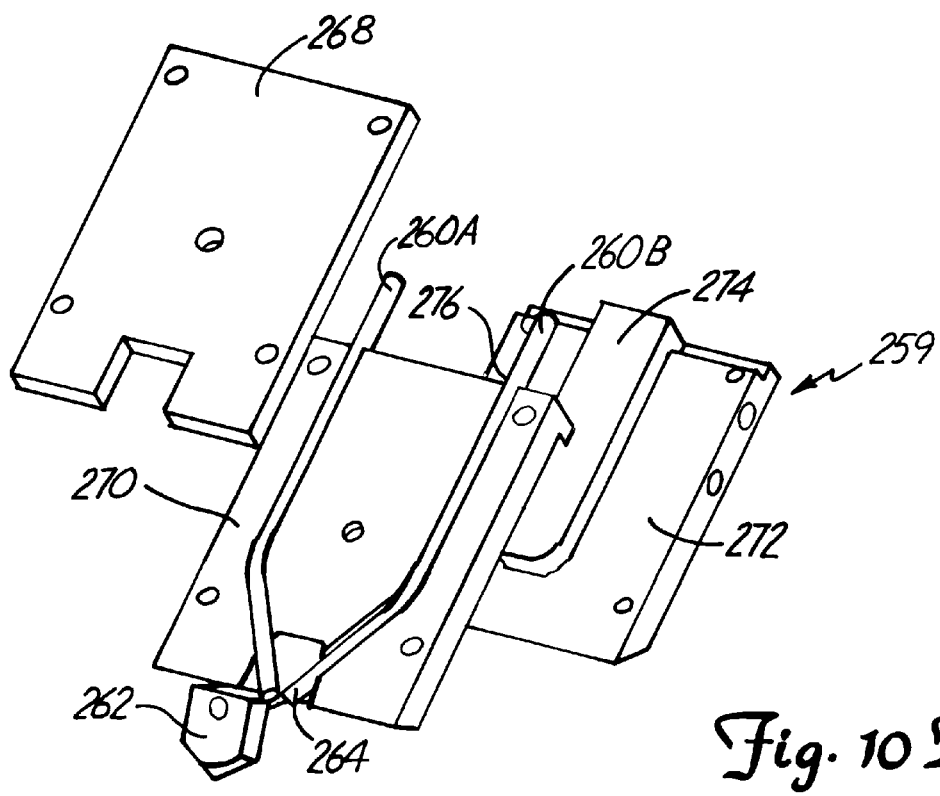

FIGS. 10A and 10B show an alternative embodiment of the liquifier. FIG. 10A shows liquifier 259 in an assembled view, while 10B shows liquifier 259 in an exploded view. In this embodiment, two thin-wall tubes 260A and 260B of the type described above flow into one, nozzle 262. A liquifier of this type can be substituted into the dispensing head shown in FIG. 8 to provide one extrusion head that dispenses, at alternate times, two different deposition materials. The two deposition materials may be a modeling and a supply material, or they may be modeling materials of two different colors or having other diverse properties. Nozzle 262 is brazed or welded to the outlet ends 264 of tubes 260A and 260B. Nozzle 262 is positioned in a vertical orientation, while tubes 260A and 260B may be angled towards the horizontal. Separate feed mechanisms (not shown) are provided for tubes 260A and 260B so that filament material is fed into only one of the tubes at any given time.

Thin-wall tubes 260A and 260B are held into position by a heating block 266. Heating block 266 is comprised of an outer plate 268, an interior plate 270 and a rear plate 272. Rear plate 272 is mounted within the extrusion head, and holds a heater 274 which extends between tubes 260. Two channels 276 which hold tubes 260A and 260B are routed through interior block 270. A set of five bolts (not shown) extend through outer plate 268, interior plate 270 and rear plate 272 to detachably hold together liquifier 259. It is an advantageous that the liquifier be removable from the heating block, for replacement and cleaning.

Although the present invention has been described with reference to preferred embodiments, workers skilled in the art will recognize that changes may be made in form and detail without departing from the spirit and scope of the invention.

We claim:

1. A rapid prototyping apparatus for making three-dimensional physical objects by sequentially depositing multiple layers of solidifying material, the rapid prototyping apparatus comprising:

an extrusion head for extruding the solidifying material;

a modeling table having a top surface;

a flexible sheet substrate for mounting on the top surface of the modeling table;

means for providing a releasable hold down force to hold the substrate against the top surface of the modeling table; and means for causing relative movement of the extrusion head and the modeling table to deposit multiple layers of the solidifying material to build up a three-dimensional physical object on the substrate.

2. The rapid prototyping apparatus of claim 1 wherein:

the flexible sheet substrate is made of a polymeric material.

3. The rapid prototyping apparatus of clam 2 wherein the polymeric flexible sheet substrate is an acrylic sheet.

4. The rapid prototyping apparatus of claim 3 wherein the substrate has a thickness of about 0.06 inches.

5. The rapid prototyping apparatus of claim 1, wherein:

the means for providing a releasable hold down force provides a vacuum to hold the substrate against the top surface of the modeling table.

6. A method of making a three-dimensional physical object by sequentially depositing multiple layers of solidifying material using an extrusion head, the method comprising:

positioning a flexible sheet substrate on a top surface of a platen;

applying a releasable hold down force between the platen and the substrate to hold the substrate against the top surface of the platen;

depositing at least one layer of a first solidifying material which adheres to the substrate;

depositing at least one layer of a second solidifying material over the layer of first material, the second material being weakly adhered to the first material; and depositing over the layer of second material a plurality of layers of the first solidifying material to form the three-dimensional physical object.

7. The method of claim 6 and further comprising:

releasing the hold down force between the platen and the flexible sheet substrate;

removing the substrate from the platen; and flexing the substrate to peel the substrate from the three-dimensional object.

8. The method of claim 6 and further comprising:

removing the second layer of second material from the three-dimensional object.

9. The method of claim 6 wherein the flexible sheet substrate is made of a polymeric material.

10. The method of claim 9 wherein the polymeric flexible sheet substrate is an acrylic sheet.

11. The method of claim 10 wherein the acrylic sheet has a thickness of about 0.06 inches.

12. The method of claim 6 wherein the releasable hold down force is a vacuum.

* * * * *